(12) United States Patent
Appel

(10) Patent No.: US 10,759,035 B2
(45) Date of Patent: Sep. 1, 2020

(54) SUCTION EXTRACTION DEVICE

(71) Applicant: Hilti Aktiengesellschaft, Schaan (LI)

(72) Inventor: Hans Appel, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 378 days.

(21) Appl. No.: 15/312,475

(22) PCT Filed: May 13, 2015

(86) PCT No.: PCT/EP2015/060545
§ 371 (c)(1),
(2) Date: Nov. 18, 2016

(87) PCT Pub. No.: WO2015/177010
PCT Pub. Date: Nov. 26, 2015

(65) Prior Publication Data
US 2017/0087707 A1 Mar. 30, 2017

(30) Foreign Application Priority Data
May 20, 2014 (EP) ..................................... 14168923

(51) Int. Cl.
*B25D 17/20* (2006.01)
*B25D 17/02* (2006.01)
(Continued)

(52) U.S. Cl.
CPC .............. *B25D 17/20* (2013.01); *B23B 47/34* (2013.01); *B23B 51/06* (2013.01);
(Continued)

(58) Field of Classification Search
CPC .......... B25D 17/20; B23B 47/34; B23B 51/06
(Continued)

(56) References Cited

U.S. PATENT DOCUMENTS 4,596,153 A * 6/1986 Macdonald ............... G01F 1/66
310/321
4,711,609 A 12/1987 Seefluth et al.
(Continued)

FOREIGN PATENT DOCUMENTS

CN 101456181 A 6/2009
CN 102189534 A 9/2011
(Continued)

*Primary Examiner* — Thanh K Truong
*Assistant Examiner* — Daniel Jeremy Leeds
(74) *Attorney, Agent, or Firm* — Davidson, Davidson & Kappel, LLC

(57) ABSTRACT

A suction extraction device has a fan, a suction head, a channel leading from the suction head to the fan, a dust filter and a collection container to hold the dust that has been deposited on the dust filter. The suction head has a tubular cavity that is arranged around the working axis and that serves to accommodate the connection section of the suction drill bit. Arranged in the cavity is a flow sensor that has a sensor surface facing the working axis and that serves to emit a measuring signal that is indicative of the air flow that is striking the sensor surface. An evaluation unit emits an error signal in response to the measuring signal if the measuring signal is lower than a threshold value for at least a prescribed period of time, whereas it suppresses the error signal if the measuring signal exceeds the threshold value during the prescribed period of time. A signaling unit displays the error signal to a user.

15 Claims, 3 Drawing Sheets

(51) Int. Cl.
*B23Q 17/00* (2006.01)
*B23B 51/06* (2006.01)
*B23B 47/34* (2006.01)
*B23Q 11/00* (2006.01)
*B25D 16/00* (2006.01)

(52) U.S. Cl.
CPC .......... *B23Q 11/0046* (2013.01); *B23Q 17/00* (2013.01); *B25D 16/00* (2013.01); *B25D 17/02* (2013.01); *B23B 2270/62* (2013.01); *B25D 2211/068* (2013.01); *B25D 2217/0057* (2013.01)

(58) Field of Classification Search
USPC ........................................................ 173/198
See application file for complete search history.

(56) References Cited

U.S. PATENT DOCUMENTS

| | | | | | |
|---|---|---|---|---|---|
| 5,278,620 | A | * | 1/1994 | Godlove | G03G 21/0011 15/256.5 |
| 5,440,193 | A | * | 8/1995 | Barrett | B64C 13/50 156/291 |
| 6,065,908 | A | * | 5/2000 | Kleine | B23B 51/00 175/415 |
| 6,189,633 | B1 | * | 2/2001 | Kleine | B23B 27/146 175/418 |
| 6,851,898 | B2 | * | 2/2005 | Ege | B23Q 11/0046 408/241 S |
| 8,409,310 | B2 | * | 4/2013 | Despineux | B23Q 11/0046 173/71 |
| 8,443,914 | B2 | | 5/2013 | Bito et al. | |
| 9,056,379 | B2 | * | 6/2015 | Yoshikane | B23Q 11/0046 |
| 9,067,292 | B2 | | 6/2015 | Appel | |
| 9,114,491 | B2 | | 8/2015 | Kakiuchi et al. | |
| 2001/0006122 | A1 | * | 7/2001 | Kleine | B23B 51/06 175/213 |
| 2001/0006123 | A1 | * | 7/2001 | Kleine | B23B 51/06 175/213 |
| 2003/0075936 | A1 | * | 4/2003 | Hsu | H01L 21/67265 294/213 |
| 2003/0087713 | A1 | * | 5/2003 | Todd | F16H 7/0829 474/111 |
| 2005/0034715 | A1 | | 2/2005 | Terpstra | |
| 2005/0105977 | A1 | * | 5/2005 | Ishihara | B23B 51/06 408/1 R |
| 2006/0137681 | A1 | * | 6/2006 | Von Hollen | A61M 15/009 128/200.14 |
| 2007/0086867 | A1 | * | 4/2007 | Kesterson | B23B 51/06 408/59 |
| 2007/0193759 | A1 | * | 8/2007 | Sweig | B25D 17/20 173/198 |
| 2009/0026881 | A1 | * | 1/2009 | Erturk | F04D 33/00 310/311 |
| 2009/0145621 | A1 | | 6/2009 | Lau et al. | |
| 2009/0193614 | A1 | * | 8/2009 | Moore | B25D 17/20 15/347 |
| 2011/0008117 | A1 | * | 1/2011 | Kasuya | B23Q 11/0046 408/67 |
| 2011/0073373 | A1 | * | 3/2011 | Rodert | B25D 17/005 175/94 |
| 2013/0033841 | A1 | * | 2/2013 | Eckhardt | H01R 12/585 361/784 |
| 2013/0136549 | A1 | * | 5/2013 | Appel | B23Q 11/0046 408/56 |
| 2013/0149056 | A1 | * | 6/2013 | Appel | B23Q 11/0071 408/58 |
| 2013/0183111 | A1 | * | 7/2013 | Lerch | B23Q 11/0071 408/56 |
| 2014/0086697 | A1 | * | 3/2014 | Kakimoto | B23B 51/009 407/115 |
| 2014/0100414 | A1 | * | 4/2014 | Tamez | A61M 1/10 600/16 |
| 2014/0119845 | A1 | * | 5/2014 | Kakimoto | B23Q 11/006 408/58 |
| 2015/0276444 | A1 | * | 10/2015 | Smith | G01F 1/584 73/861.12 |
| 2016/0114448 | A1 | * | 4/2016 | Appel | A47L 7/0095 15/339 |
| 2017/0001335 | A1 | * | 1/2017 | Miyanaga | B28D 1/146 |
| 2018/0311778 | A1 | * | 11/2018 | Meiser | B23Q 11/0071 |

FOREIGN PATENT DOCUMENTS

| | | |
|---|---|---|
| CN | 102791436 A | 11/2012 |
| CN | 103128337 A | 6/2013 |
| DE | 102006031507 | 1/2008 |
| EP | 0940864 | 8/1999 |
| WO | WO 2014070072 A1 | 5/2014 |

* cited by examiner

SUCTION EXTRACTION DEVICE

The present invention relates to a suction extraction device for a suction drill bit.

BACKGROUND

U.S. Pat. Appln. No. 2013/0136549 describes a suction extraction device for suction drill bits. The suction extraction device draws in the dust-laden air from the suction drill bit. A filter separates the dust into a collection container.

SUMMARY OF THE INVENTION

The suction extraction device according to the invention is designed for a suction drill bit that has a hollow shank and, on a connection section, a suction opening that opens radially into the hollow shank. The suction extraction device has a fan, a suction head, a channel leading from the suction head to the fan, a dust filter and a collection container to hold the dust that has been deposited on the dust filter. The suction head has a tubular cavity that is arranged around the working axis and that serves to accommodate the connection section of the suction drill bit. Arranged in the cavity is a flow sensor that has a sensor surface facing the working axis and that serves to emit a measuring signal that is indicative of the air flow that is striking the sensor surface. An evaluation unit emits an error signal in response to the measuring signal if the measuring signal is lower than a threshold value for at least a prescribed period of time (T), whereas it suppresses the error signal if the measuring signal exceeds the threshold value during the prescribed period of time (T). A signaling unit displays the error signal to a user.

An air flow exits the suction drill bit at its connection section. The rotating suction drill bit deflects the air flow alternatingly onto the flow sensor arranged according to the invention as well as next to the flow sensor. Therefore, the flow sensor emits a measuring signal with an alternating amplitude. Unless the suction drill bit is clogged, the measuring signal remains constant. The generated measuring signal can be associated with the suction drill bit.

In one embodiment, the sensor surface has an unobstructed view of the working axis. Advantageously, the distance between the sensor surface and the suction drill bit is small. Along the working axis, the cavity has a front circular opening and a rear circular opening. The radial distance from the sensor surface to the working axis can be less than 120% of the radii of the openings.

In one embodiment, the sensor surface covers an angular range of less than 60° around the working axis. The flow sensor can be arranged relative to the working axis at a distance of at least 60° from a passage of the channel into the cavity. Special preference is given to an arrangement diametrically opposite from the passage. The weak air flows in the circumferential direction in this area falsify only slightly the measurements of the radial air flows.

BRIEF DESCRIPTION OF THE DRAWINGS

The description below explains the invention on the basis of embodiments and figures given by way of example. The figures show the following.

Unless otherwise indicated, identical or functionally equivalent elements are designated in the figures with the same reference numerals.

DETAILED DESCRIPTION

Figure 1:
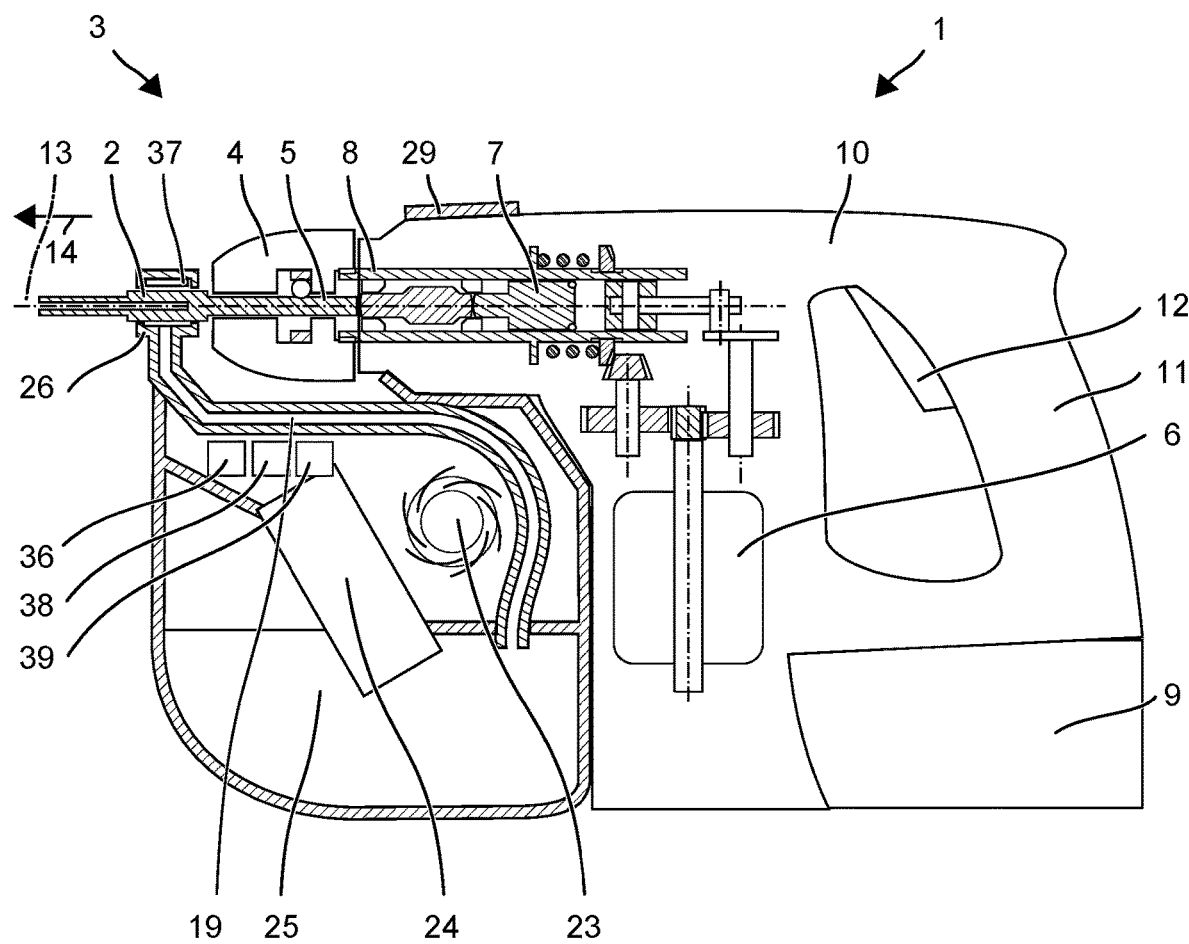
FIG. 1: a hammer drill with a suction extraction device.
Figure 2:
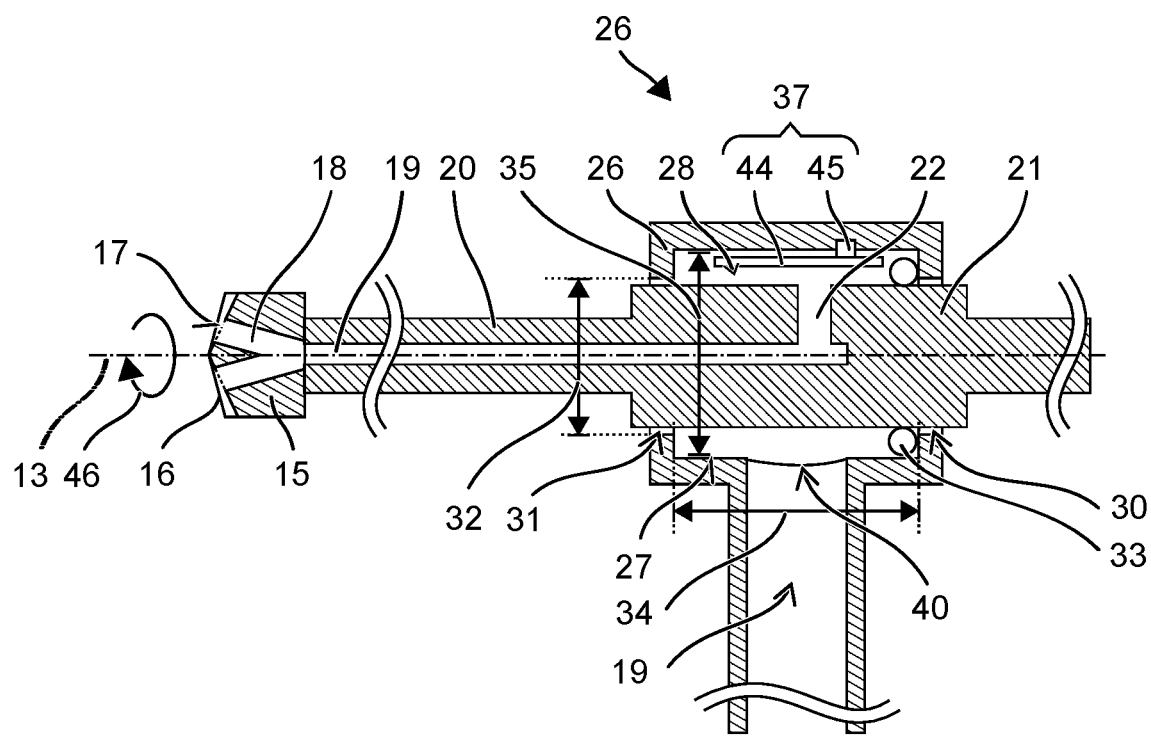
FIG. 2: a detailed view of a suction head of the suction extraction device.
Figure 3:
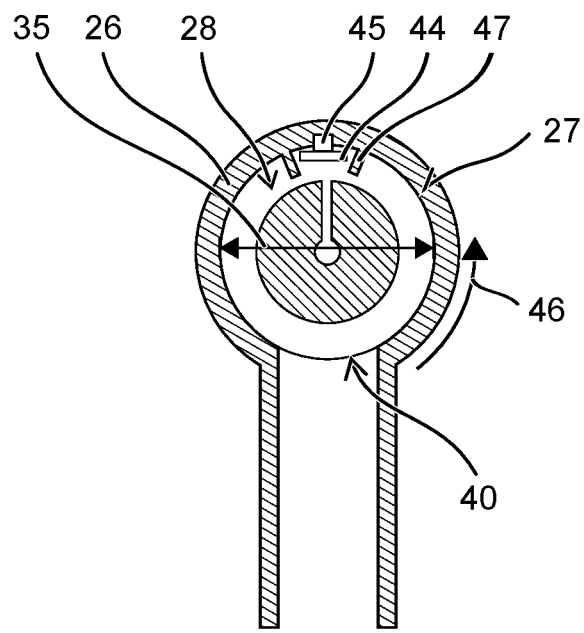
FIG. 3: a sectional view through the suction head.
Figure 4:
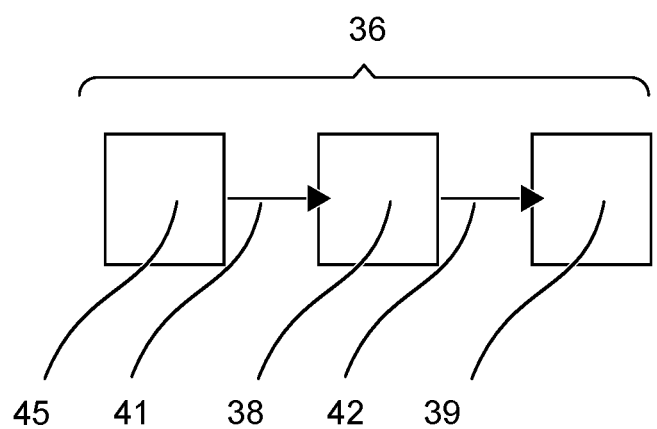
FIG. 4: a depiction of an evaluation unit.
Figure 5:
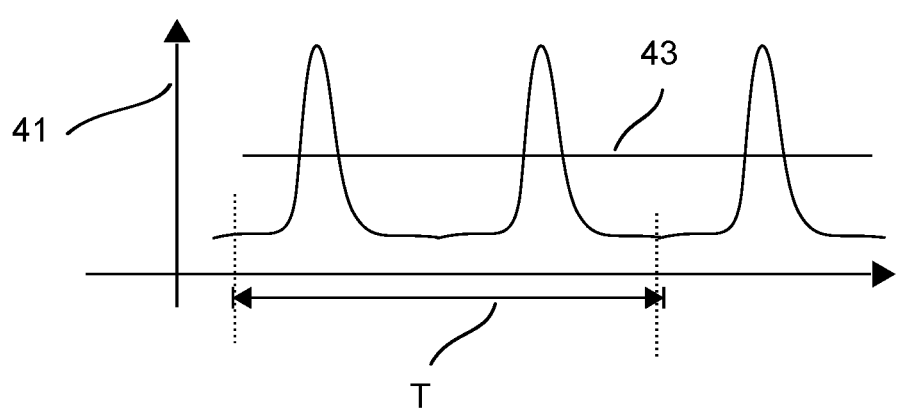
FIG. 5: the curve of a measuring signal.

FIG. 1 shows a hammer drill 1, a suction drill bit 2 and a suction extraction device 3 for the suction drill bit 2.

The hammer drill 1 has a tool socket 4 into which an insertion end 5 of the suction drill bit 2 is inserted. A primary drive of the hammer drill 1 is in the form of an electric motor 6 that drives a pneumatic striking mechanism 7 and a driven shaft 8. A battery pack 9 or a mains line supplies the electric motor 6 with power. The electric motor 6, the striking mechanism 7 and the additional drive components are arranged in a tool housing 10. A handle 11 is attached to the tool housing 10. The user can guide the hammer drill 1 by means of the handle 11 and start up the hammer drill 1 by means of a system switch 12. During operation, the hammer drill 1 continuously rotates the suction drill bit 2 around a working axis 13 and, in this process, it can cause the drill bit 2 to strike into a substrate in the striking direction 14 along the working axis 13.

The suction drill bit 2 has a drill head 15 with two or more blunt blades 16 facing in the striking direction 14. The blades 16 are designed to comminute rock by means of chiseling action. The drill head 15 has several suction openings 18 on its front end 17 between the blades 16. The suction openings 18 open up into a channel 19 situated in a hollow shank 20 of the suction drill bit 2. The rock that has been crushed and ground up by the blades 16 is transported out of the drilled hole through the suction openings 18. Adjoining the insertion end 5, the hollow shank 20 has a connection section 21 through which a suction opening 22 passes radially all the way into the channel 19. The suction extraction device 3 is connected to the connection section 21 and it removes the dusty and sandy drillings at the connection section 21.

The suction extraction device 3 has a fan 23, a dust filter 24 and a collection container 25. The fan 23 comprises, for example, an electric motor and an impeller. The electric motor is supplied by the battery pack 9 of the hammer drill 1 or by a separate source of power. The fan 23 is connected to a suction head 26 via a channel 19. The channel 19 penetrates into the inner wall 27 of the suction head 26 essentially perpendicularly to the working axis 13. The fan 23 conveys the dust-laden air out of the cavity 28 of the suction head 26. The dust filter 24 is arranged upstream from the fan 23 in the flow direction. The dust is separated from the air and deposited onto the dust filter 24. The collection container 25 is arranged upstream from and adjacent to the dust filter 24 in the flow direction and it captures the separated dust. The collection container 25 can be removed from the suction extraction device 3 in order to be emptied. The suction extraction device 3 can be detachably attached to the tool housing 10 of the hammer drill 1. The suction extraction device 3 given by way of an example has a bushing 29 that is placed onto the neck of the hammer drill 1.

The suction head 26 accommodates the connection section 21 of the suction drill bit 2 along the working axis 13. The suction head 26 surrounds a largely cylindrical cavity 28 that is concentric to the working axis 13. The cavity 28 is open along the working axis 13 in both directions via circular openings 30, 31 that are concentric to the working axis 13. The two openings 30, 31 are flush with the inserted suction drill bit 2, namely, at its connection section 21. The diameters 32 of the openings 30, 31 are correspondingly identical to the outer diameter of the connection section 21. The openings 30 can be provided with gaskets 33 which improve the air-tight closure of the openings 30 vis-à-vis the connection section 21. The distance 24 of the two openings 30, 31 and thus the length 34 of the cavity 28, is larger than the stroke of the suction drill bit 2 during hammering operation. The maximum stroke is defined by the insertion end 5. The cavity 28 is preferably between 1 cm and 3 cm long. The cavity 28 has an inner diameter 35 that is larger than the diameter 32 of the openings 30, 31. The connection section 21 does not touch the radial inner wall 27 of the suction head. Air can circulate around the circumferential surface of the connection section 21, which is closed off between the openings 30, 31. The dust-laden air can thus exit the suction opening 22 and can enter the cavity 28, irrespective of the momentary angular position of the suction drill bit 2. The inner wall 27 is preferably cylindrical.

The suction extraction device 3 has a monitoring unit 36 which warns the user in case the suction drill bit 2 becomes clogged with drillings. The monitoring unit 36 comprises a flow sensor 37 in the suction head 26, an evaluation unit 38 for the flow sensor 37 and a signaling unit 39.

The flow sensor 37 is arranged in the cavity 28 of the suction head 26. The flow sensor 37 faces the working axis 13. The flow sensor 37 is preferably situated diametrically opposite from the passage 40 of the channel 19, or else it is at a distance of at least 60° from the passage 40 relative to the working axis 13. The flow sensor 37 responds if an air flow strikes the flow sensor 37 in the radial direction. The flow sensor 37 covers a limited angular range around the working axis 13, for instance, less than 60°. Periodically and alternatingly, the air flow exiting the suction opening 22 of the suction drill bit 2 strikes the flow sensor 37 directly as well as adjacently while the suction drill bit 2 is rotating. The flow sensor 37 emits an appropriate periodic measuring signal 41.

The evaluation unit 38 evaluates the measuring signal 41 of the flow sensor 37 to check for the occurrence of the periodicity. The evaluation unit 38 indicates an error 42 if the measuring signal displays a constant level for a prescribed period of time T. The prescribed period of time T is longer than the typical duration of a complete rotation of the suction drill bit 2 around the working axis 13. The duration is, for example, within the range of 100 ms to 1 s. For instance, the evaluation unit 38 compares the measuring signal 41 to a threshold value 43. The measuring signal 41 has to be greater than the threshold value 43 at least once during the prescribed period of time T, and once smaller than the threshold value 43. A timer is reset, for example, every time the measuring signal 41 exceeds the threshold value 43, that is to say, when the air flow strikes the vane 44. If there is no reset during the period of time T, the error signal 42 is emitted.

The error signal 42 is associated with clogging of the suction drill bit 2 caused by drillings. Even though the fan 23 draws in air from the suction head 26, no air exits the suction opening 22 of the suction drill bit 2. The error signal 42 can be indicated to the user by means of a display 39 or else acoustically. As an alternative or in addition, the evaluation unit 38 transmits the error signal to the hammer drill 1 whose electric motor 6 is then switched off.

The flow sensor 37 has, for instance, a vane 44 whose sensor surface runs parallel to the working axis 13 and faces the working axis 13. The vane 44 is deflected in the radial direction by the air flow. The vane 44 is attached to a piezoelectric sensor 45. The deflection of the vane 44 generates a voltage pulse in the sensor 45. The vane 45 is narrow in the circumferential direction 46 and it extends along the working axis 13 over at least half the length 34 of the cavity 28. The vane 44 is preferably at a small distance from the suction drill bit 2. For instance, the distance to the working axis 13 is less than 55% of the diameter of the connection section 21 of the suction drill bit 2. Instead of the vane 44 and the piezoelectric sensor 45, it is also possible to use other sensor surfaces and transducers whose measuring signal 41 changes when the air flow strikes the sensor surface 44 in the radial direction. For example, a pressure capsule having a membrane that faces the working axis 13 or a flat piezoelectric pressure sensor can be used. The sensor surface 44 is at a small distance from the suction drill bit 2. The flow sensor 37 can be shielded in the circumferential direction 46 by walls 47.

The monitoring unit 36 can receive a control signal from the hammer drill 1 indicating when the tool socket 4 and thus the suction drill bit 2 is rotating. The control signal can also indicate, for example, the rotational speed. The monitoring unit 36 is activated in response to the control signal if the tool socket 4 is rotating. The period of time T can be determined as a function of the rotational speed, for instance, the period of time T amounts to between 150% and 300% of the inverse of the rotational speed.

What is claimed is:

1. A suction extraction device for a suction drill bit having a hollow shank and, on a connection section, a suction opening opening radially into the hollow shank, the suction extraction device comprising:
   a fan;
   a suction head having a tubular cavity arranged around a working axis and serving to accommodate the connection section, the tubular cavity having an inner wall;
   two radial walls extending inwardly from the inner wall;
   a channel connecting the cavity to the fan;
   a dust filter arranged in the channel;
   a collection container to hold dust that has been deposited on the dust filter;
   a flow sensor having a sensor surface arranged in the cavity and facing the working axis, the flow sensor being between the two radial walls to shield the flow sensor in a circumferential direction and serving to emit a measuring signal indicative of the air flow striking the sensor surface;
   an evaluation unit, the evaluation unit, in response to the measuring signal, emitting an error signal if the measuring signal is lower than a threshold value for at least a prescribed period of time, and suppressing the error signal if the measuring signal exceeds the threshold value during the prescribed period of time; and
   a signaling unit serving to display the error signal to a user.

2. The suction extraction device as recited in claim 1 wherein a line between at least one point on the sensor surface and the working axis is unobstructed during a portion of a rotation of the suction head.

3. The suction extraction device as recited in claim 1 wherein the cavity has a front circular opening and a rear circular opening along the working axis, and the radial distance from the sensor surface to the working axis is less than 120% but greater than 100% of the radii of the openings.

4. The suction extraction device as recited in claim 1 wherein 360° degrees exist circumferentially around the working axis and wherein the limited angular range is less than 60° around the working axis.

5. The suction extraction device as recited in claim 1 wherein the flow sensor is arranged relative to the working axis at at least 60° from a passage of the channel into the cavity.

6. The suction extraction device as recited in claim 1 wherein the flow sensor is arranged relative to the working axis at 180° from a passage of the channel into the cavity so as to be diametrically opposite from passage.

7. The suction extraction device as recited in claim 1 wherein the cavity has a front circular opening and a rear circular opening along the working axis, diameters of the openings permitting a fit of an outer diameter of the connection section.

8. The suction extraction device as recited in claim 1 wherein the cavity has a front circular opening and a rear circular opening along the working axis, a gasket sitting within the cavity.

9. The suction extraction device as recited in claim 1 wherein the cavity has a front circular opening and a rear circular opening along the working axis, a distance between the front circular opening and the rear circular opening defining a length of the cavity and being larger that a stroke of the suction drill bit.

10. The suction extraction device as recited in claim 1 wherein the cavity has a front circular opening and a rear circular opening along the working axis, a distance between the front circular opening and the rear circular opening defining a length of the cavity between 1 cm and 3 cm.

11. The suction extraction device as recited in claim 1 wherein the cavity has a front circular opening and a rear circular opening along the working axis, an inner diameter of the cavity being larger than a diameter of the front circular and rear circular openings.

12. The suction extraction device as recited in claim 1 wherein the flow sensor has a vane attached to a piezoelectric sensor.

13. The suction extraction device as recited in claim 12 wherein the vane is at a distance to the working axis that is less than 55% but greater than 50% of a diameter of the connection section.

14. A hammer drill comprising
a motor;
a tool socket to accommodate a suction drill bit on the working axis;
a motor-driven pneumatic striking mechanism; and
a suction extraction device as recited in claim 1.

15. A control method for a suction extraction device as recited in claim 1 comprising the following steps:
operating the fan for drawing in air from the cavity into the sleeve-shaped suction head;
detecting an air flow that, in the radial direction, strikes the sensor surface of the flow sensor situated in the cavity; and
triggering an error signal if the measuring signal prescribed by the flow sensor as the parameter of the measuring signal and emitted for the air flow remains constantly below a threshold value for a period of time T, and suppressing the error signal if the measuring signal is at times lower than the threshold value and at times greater than the threshold value during the prescribed period of time.

\* \* \* \* \*